(12) United States Patent
Rose et al.

(10) Patent No.: US 12,250,939 B2
(45) Date of Patent: Mar. 18, 2025

(54) PEST CONTROL BARRIER

(71) Applicants: Bryan Rose, Woodhaven, MI (US); Nazih Hussein, II, St. Clair, MI (US)

(72) Inventors: Bryan Rose, Woodhaven, MI (US); Nazih Hussein, II, St. Clair, MI (US)

( * ) Notice: Subject to any disclaimer, the term of this patent is extended or adjusted under 35 U.S.C. 154(b) by 67 days.

(21) Appl. No.: 17/545,761

(22) Filed: Dec. 8, 2021

(65) Prior Publication Data

US 2022/0183264 A1 Jun. 16, 2022

Related U.S. Application Data

(60) Provisional application No. 63/125,730, filed on Dec. 15, 2020.

(51) Int. Cl.
*A01M 1/14* (2006.01)
*A01M 23/00* (2006.01)

(52) U.S. Cl.
CPC ............ *A01M 1/14* (2013.01); *A01M 23/005* (2013.01)

(58) Field of Classification Search
CPC ...... A01M 1/14; A01M 23/005; A01M 29/30; A01M 29/34
See application file for complete search history.

(56) References Cited

U.S. PATENT DOCUMENTS

| | | | | |
|---|---|---|---|---|
| 4,350,122 A * | 9/1982 | Shotwell | ............ | A01K 27/007 119/856 |
| 5,168,831 A * | 12/1992 | Ittershagen | .......... | A01K 15/006 119/905 |
| 8,389,090 B2 * | 3/2013 | Pemberton | ............ | A47B 97/00 428/40.1 |
| 10,499,627 B2 * | 12/2019 | Haire | ...................... | A01M 1/14 |
| 2006/0265942 A1 | 11/2006 | Watson | | |
| 2009/0025310 A1 * | 1/2009 | Harris | .................... | A01M 29/34 119/61.53 |
| 2014/0020280 A1 | 1/2014 | Cullen | | |
| 2016/0278361 A1 * | 9/2016 | Work | .................... | A01M 1/026 |
| 2019/0075782 A1 | 3/2019 | Pradines et al. | | |
| 2022/0030849 A1 * | 2/2022 | Sharp | .................... | A01M 29/30 |

FOREIGN PATENT DOCUMENTS

| | | | | |
|---|---|---|---|---|
| DE | 202011105243 U1 * | 8/2012 | ............ | A01M 29/30 |
| JP | 2018-3335 A | 1/2018 | | |
| KR | 100992175 B1 * | 11/2010 | | |
| WO | 2021/019894 A1 | 2/2021 | | |

* cited by examiner

*Primary Examiner* — David J Parsley
*Assistant Examiner* — Shada Mohamed Alghailani
(74) *Attorney, Agent, or Firm* — Varnum LLP

(57) ABSTRACT

A pest control barrier is provided. The pest control barrier comprises a continuous barrier track disposed about an entirety of a predefined perimeter. The predefined perimeter may define an interior space and be disposed along an entirety of an outer boundary of the interior space. The continuous barrier track may comprise a topical catch layer. The topical catch layer contains a quantity of pressure sensitive adhesive material dispersed throughout the topical catch layer sufficient to restrain a pest from free movement away from the topical catch layer, such that the continuous barrier track forms a continuous catch loop about the predefined perimeter that bars entry into or exit from the interior space by a pest such as, but not limited to, rodents, snakes, insects, arachnids, pedes, scorpions, and/or other pests. In this way, an object disposed within the interior space defined by the predefined perimeter may also remain pest free.

18 Claims, 11 Drawing Sheets

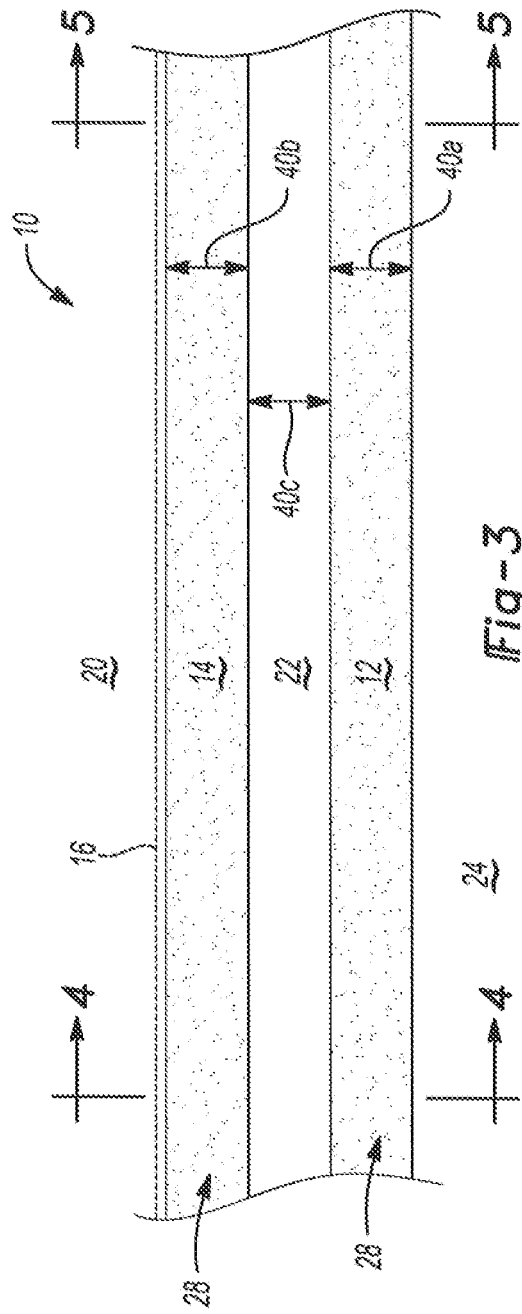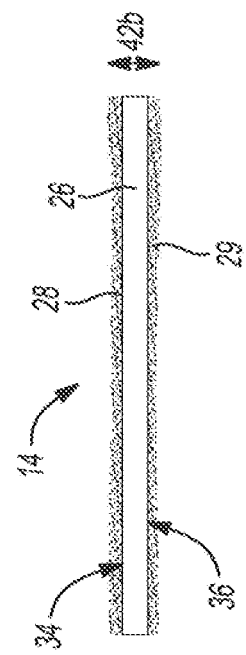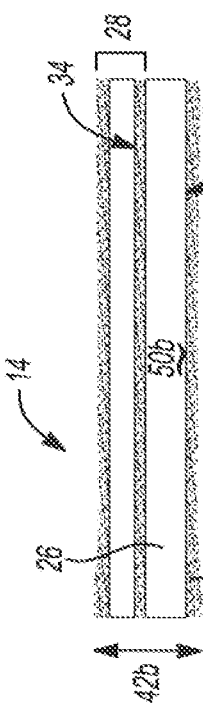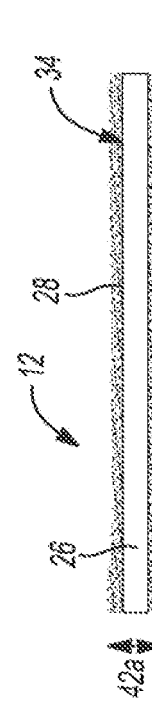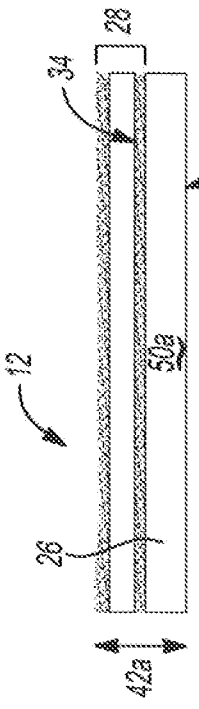

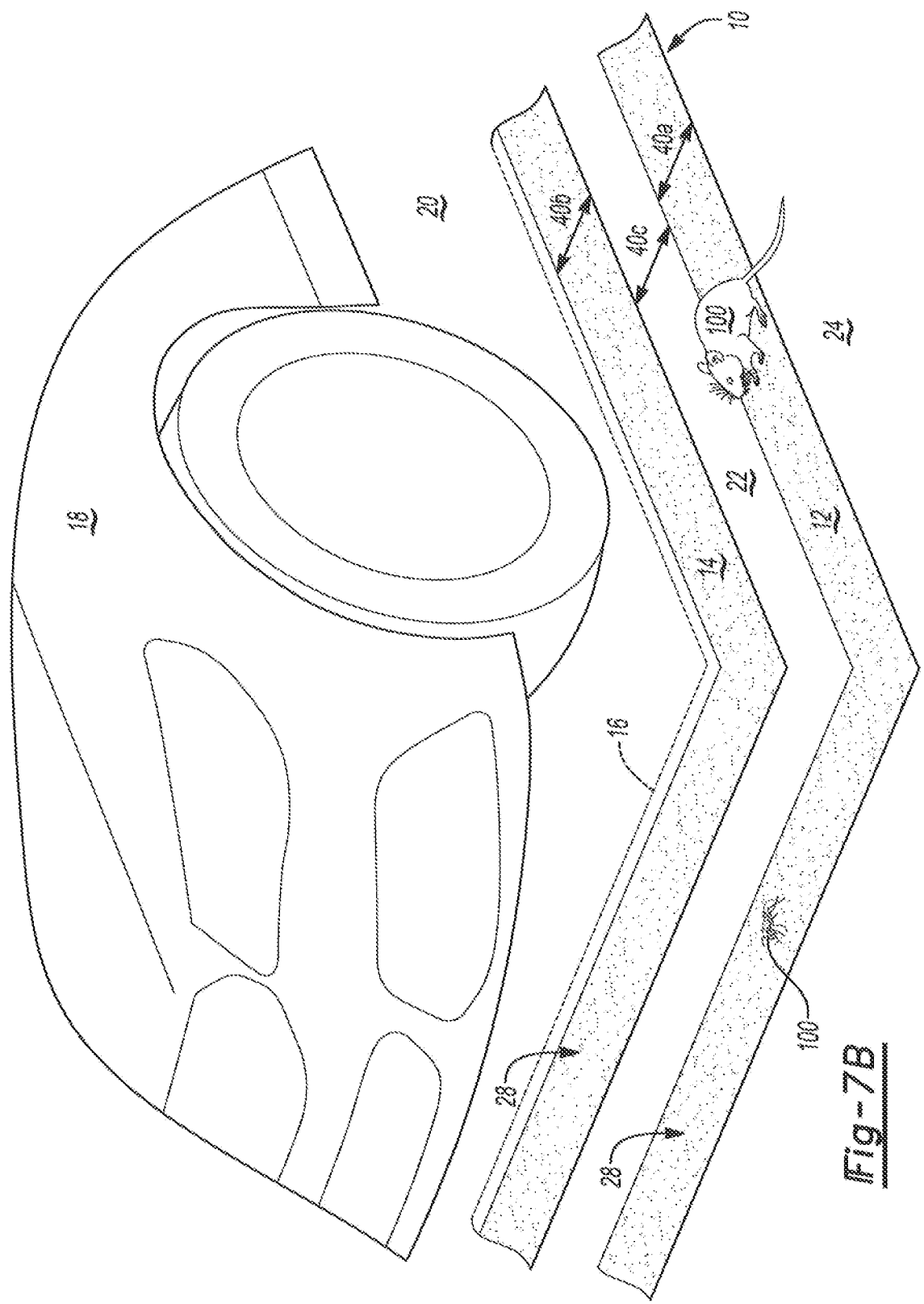

PEST CONTROL BARRIER

CROSS REFERENCE TO RELATED APPLICATIONS

This application claims the benefit of U.S. Provisional Application No. 63/125,730, filed Dec. 15, 2020, which is hereby incorporated by reference in its entirety.

TECHNICAL FIELD

The present disclosure relates to a pest control barrier.

BACKGROUND

This invention relates to a pest control barrier. Conventional pest control traps come in many forms including glue-based traps, live traps that entrap the pest in a housing, spring-based traps, and the like, which are designed to catch, restrain, or eliminate a single pest in a general area. However, while such conventional pest control traps serve to trap a particular pest in a general area, these conventional traps have not been entirely satisfactory in creating a pest control barrier preventing entry of any and all prospective pests of a variety of types into and/or out of a controlled perimeter.

SUMMARY

A pest control barrier is provided. The pest control barrier may comprise a continuous barrier track positioned between an interior space and an exterior space. The continuous barrier track may be disposed about an entirety of a predefined perimeter. The predefined perimeter may define the interior space having an outer boundary, such that the predefined perimeter follows the entirety of the outer boundary and borders the interior space itself and/or an object positioned within the interior space. The exterior space may be positioned opposite the interior space relative to the continuous barrier track.

The continuous barrier track may comprise a topical catch layer. The topical catch layer may be an adhesive tape or the like that contains a first adhesive material. The first adhesive material may comprise a quantity of pressure sensitive natural or synthetic elastomeric resin adhesive material dispersed throughout the topical catch layer sufficient to restrain a pest from free movement away from the topical catch layer, such that the continuous barrier track is adapted for use as a pest capture apparatus.

The continuous barrier track may form a continuous and closed loop about the predefined perimeter, such that the barrier track functions as a pest control barrier and/or blockade that bars one or more pests such as, but not limited to rodents, snakes, insects, arachnids, pedes, scorpions, and/or other pests from traversing the continuous barrier track from the interior space to the exterior space or from the exterior space to the interior space. In this way, the pest control barrier may act as a pest blockade, such that one side of the pest control barrier may remain free from pests originating or located on the opposite side of the pest control barrier.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 3 is an enlarged plan view of a portion of the pest control barrier shown in FIGS. 1A and 2.

FIG. 4 is a first example cross-sectional view of a portion of the pest control barrier taken along line 4-4 in FIG. 3.

FIG. 5A is a second example cross-sectional view of a portion of the pest control barrier taken along line 5-5 in FIGS. 3 and 5A-5D having no mounting layer.

FIG. 5B is the second example cross-sectional view of a portion of the pest control barrier taken along line 5-5 in FIGS. 3 and 5A-5D having a mounting layer.

FIG. 7B is a schematic perspective view of the example pest control barrier with a pest restrained on and/or inhibited from free movement away from the first barrier track.

DETAILED DESCRIPTION

Figure 1A:
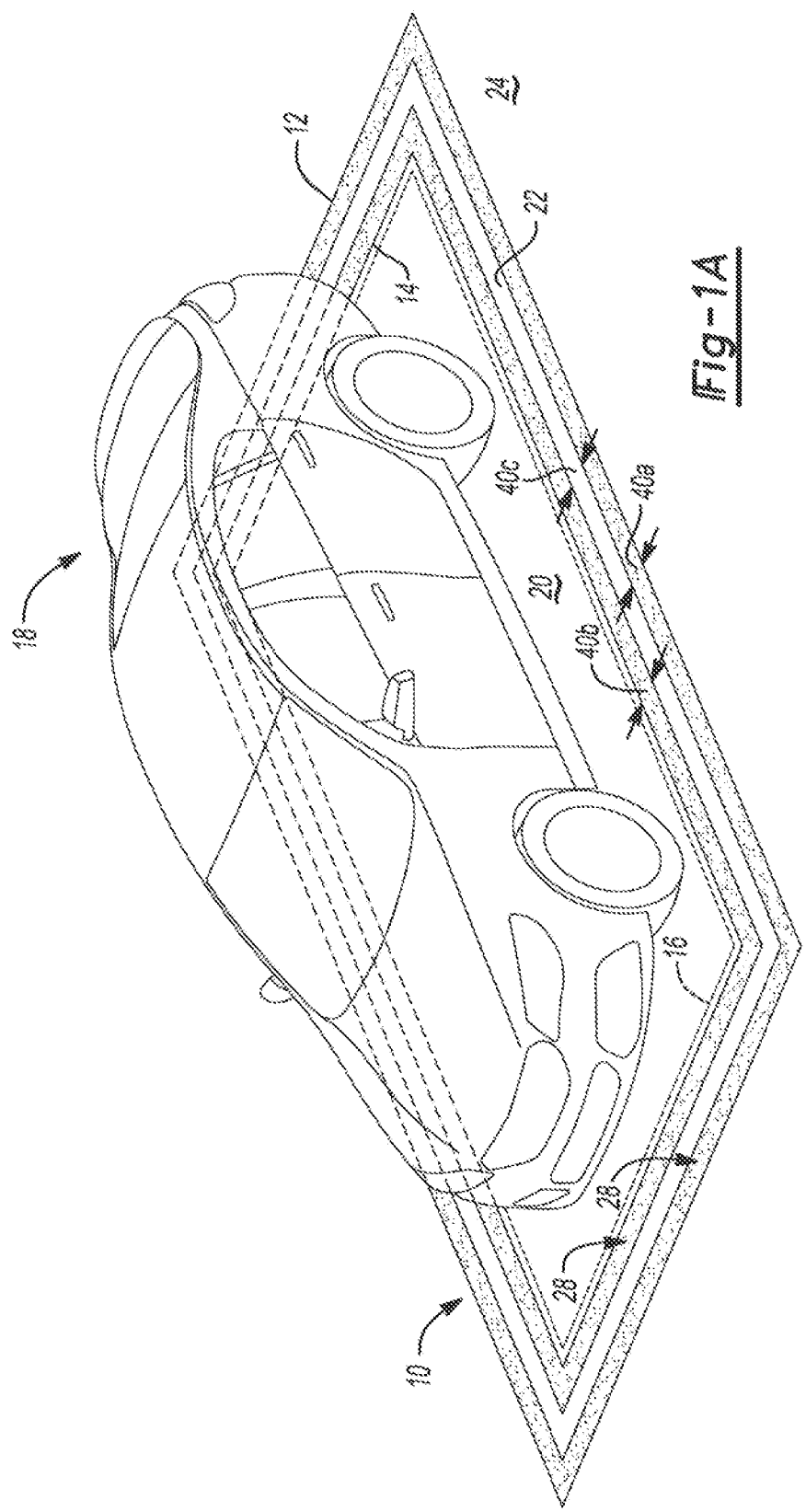
FIG. 1A is a schematic first perspective view of an example configuration of the pest control barrier of the present invention.
Figure 1C:
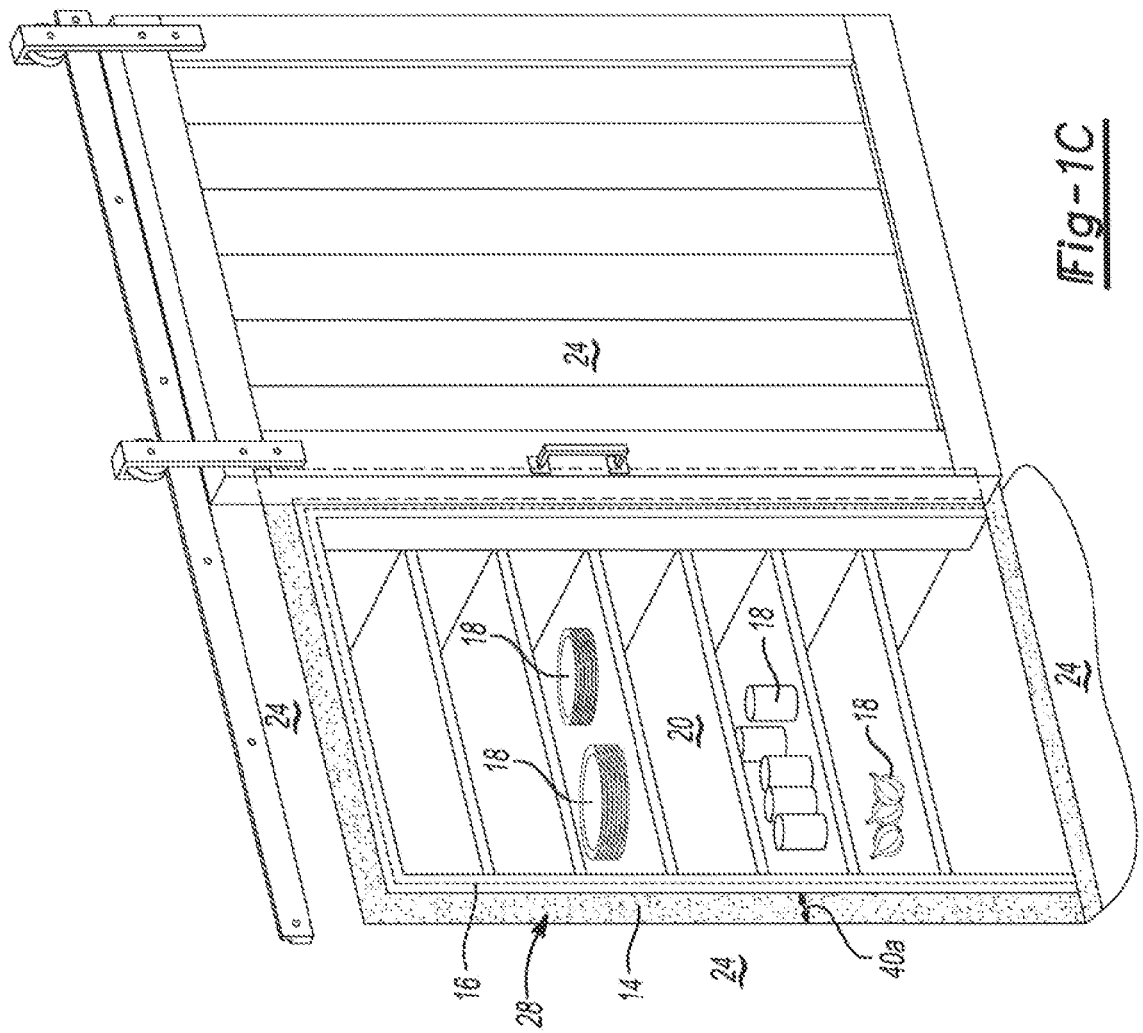
FIG. 1C is a schematic first perspective view of another example configuration of the pest control barrier of the present invention.
Figure 1B:
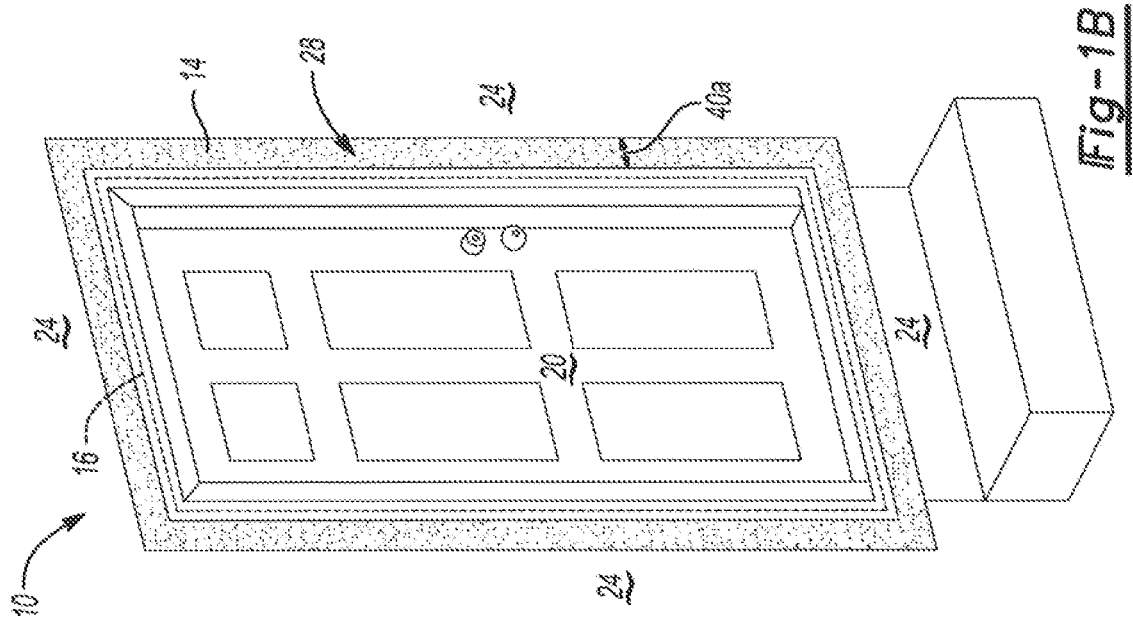
FIG. 1B is a schematic first perspective view of another example configuration of the pest control barrier of the present invention.
Figure 2:
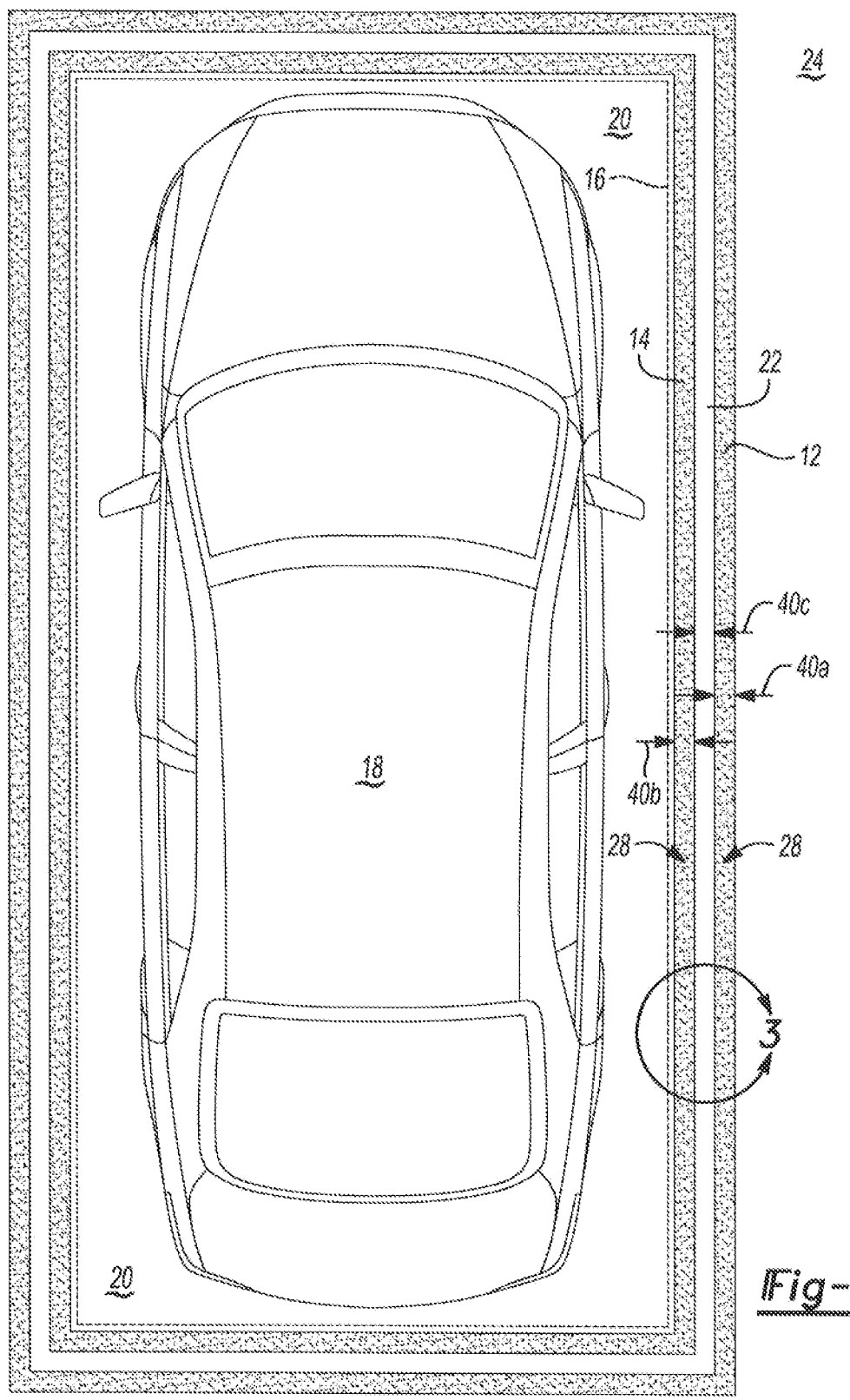
FIG. 2 is a plan view of the example configuration of the pest control barrier shown in FIG. 1A.

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions.

In addition, the term "proximal" refers to a direction that is nearer a center of a component. Likewise, the term "distal" refers to a relative position that is further away from a center of the component. Thus, the terms proximal and distal may be understood to provide generally opposing terms to describe relative spatial positions.

Referring to the drawings, wherein like reference numerals refer to like components throughout the several views, a pest control barrier 10 for household, residential, commercial, or industrial use is provided. In a general sense, the pest control barrier 10 of the present disclosure comprises a continuous barrier track 12, 14 coated in a pressure-sensitive adhesive material. The barrier track 12, 14 is positioned about an entirety of a predefined perimeter 16 of an interior space 20. The pressure-sensitive adhesive material has an adhesion strength sufficient to restrain a pest 100 from free movement away from the barrier track 12, 14. In this way, the continuous barrier track 12, 14 is adapted for use as a pest capture apparatus, such that the prospective pest travels, e.g., walks, crawls, slithers, hops, lands, and/or jumps onto the pressure-sensitive adhesive material disposed on the continuous barrier track 12, 14 and remains stuck thereon. In this way, the pest control barrier 10 prevents the respective pest 100, including but not limited to rodents, snakes insects, arachnids, pedes, scorpions, and/or other pests, from entering or exiting the interior space 20 and/or an object 18 contained in the interior space 20 within the established predefined perimeter 16. Said another way, the pest control barrier 10 prevents the respective pest 100 from crossing the predefined perimeter 16 from the interior space 20 to the exterior space 24 or from the exterior space 24 to the interior space 20.

Referring to FIGS. 1A-1C and 2, the pest control barrier 10 is provided. The pest control barrier 10 may comprise a barrier track 12, 14 disposed about an entirety of a predefined perimeter 16. The predefined perimeter 16 may define an interior space 20 having an outer boundary, such that the predefined perimeter 16 borders an entirety of the outer boundary of the interior space itself 20 and/or an object 18 such as, but not limited to a vehicle, automobile, furniture, storage container, doorway, cabinets, food areas, or the like, positioned within the interior space 20.

The barrier track 12, 14 may have a width 40a, 40b and a thickness 42a, 42b. The thickness 42a, 42b may range from about 0.010 inches to about 0.313 inches. Such a thickness 42a, 42b range allows for the barrier track 12, 14 to maintain a low profile in order to allow a small pest to travel onto, e.g., walk, crawl, slither, or creep onto the continuous barrier track 12, 14 without alerting the pest 100 of the barrier either visually or via tactile sensory mechanisms of the respective pest 100, e.g., whiskers, antennas, etc. Further, such a low profile allows the continuous barrier track 12, 14 to blend into the surroundings in the usable area around the predefined perimeter 16, interior space 20 and/or the object 18. In this way, the barrier track 12, 14 further remains non-obstructive to the usable area around the predefined perimeter 16, interior space 20 and/or the object 18 therein, all while remaining robust enough to serve the pest deterring and capturing function of the continuous barrier track 12, 14. For example, as configured, the barrier track 12, 14 does not obstruct a human user or a larger animal such as a domestic pet, from stepping over the barrier track 12, 14, such that the barrier track 12, 14 does not present a tripping hazard in the usable area around the predefined perimeter 16.

The continuous barrier track 12, 14 may be formed in a variety of colors, such that the continuous barrier track 12, 14 may be purchased in the user's color of choice, such that it may blend into the surroundings in the usable area around the predefined perimeter 16, interior space 20 and/or the object 18 or make a stark contrast with the surroundings in the usable area around the predefined perimeter 16, interior space 20 and/or the object 18.

The barrier track width 40a, 40b may be from about 1.0 inches to about 8.0 inches. The width 40a, 40b may vary within the range based on the anticipated pest 100. For example, in embodiments wherein the anticipated pest is an insect, the width 40*a*, 40*b* of the barrier track 12, 14 may be less than in examples wherein the anticipated pest 100 is a rodent. In one example, wherein the anticipated pest 100 is an insect, the width of the barrier track 12, 14 may be from about 1.0 inches to about 3.0 inches. In another example, wherein the anticipated pest 100 is a rodent, the width of the barrier track 12, 14 may be from about 3.0 inches to about 8.0 inches.

In one example, shown in cross-section in FIG. 4, the barrier track 12, 14 may be a two-sided adhesive tape with an adhesion strength of from about 1.5 pounds per inch to about 10.0 pounds per inch. The adhesion strength of each side of the two-sided adhesive tape will increase with the size of the anticipated pest 100. For example, when the anticipated pest 100 is a larger pest such as a rodent or the like, a greater adhesion strength may be needed to secure the respective pest 100 on the barrier track 12, 14 and the barrier track to the mounting surface, than when the intended pest 100 is a smaller pest, such as a small insect.

In this way, the pest control barrier 10 prevents the respective pest 100, including but not limited to rodents, snakes, insects, arachnids, pedes, scorpions, and/or other pests, from entering or exiting the interior space 20 and/or an object 18 contained in the interior space 20 within the established predefined perimeter 16. In one example, the barrier track 12, 14 may be placed about a perimeter 16 of an object 18 that the user desired to keep pest 100 free. In another example, the barrier track 12, 14 may be placed about a perimeter 16 of an object 18 known to contain pests 100, which the user wishes to contain within the outer boundary of the interior space 20 defined by the perimeter 16.

The adhesive tape may be a cloth tape, vinyl tape, or another two-sided tape construction. Example adhesive tapes have a thickness from about 0.0005 inches to about 0.01 inches and a peel adhesion strength, pursuant to ASTM D3330, of from about 2.0 pounds per inch to about 6.5 pounds per inch. Suitable, commercially-available example tapes include, but are not limited to product sold under the following product identifiers: "Scotch® General Purpose Cloth Duct Tape 393", "3M® Heavy Duty Duct Tape 3939", "3M® Repositionable Tape 9425", and "FT EZ-8" by Avery Dennison Corporation.

In such an example, the two-sided adhesive tape forming the barrier track 12, 14 may be packaged in a roll style shape that is easy for the user to position and cut to any size or shape, e.g., linear, curvilinear, polygonal, etc., which further provides a camouflage of the pest control barrier 10 to the respective pest 100. The two-sided adhesive tape may further be perforated throughout. Further, used or damaged portions of the barrier track 12, 14 may be cut away or otherwise detached from the remaining usable portions of the barrier track 12, 14. In such an example, the user may readily cut away used or damaged portions of the track 12, 14 and replace the same with additional adhesive tape material for continued pest control use.

In another example, the barrier track 12, 14 may be a multilayer barrier track 12, 14, as shown in cross-section in FIG. 5A. In such an example, the barrier track 12, 14 may comprise a substrate layer 26 having a first surface 34 and a second surface 36. The substrate layer 26 may be comprised of a flexible material, such as a polymeric material, an elastomeric material, a vinyl material, or the like, such that the barrier track 12, 14 may be installed on a planar surface such as a polished concrete, tiled floor, wood, or laminate floor, a vertical wall, a ceiling, or another planar surface, or alternatively on a non-planar, uneven, or irregular surface, such as a dirt, stucco, textured concrete, or tiled floor or another non-planar, uneven, or irregular surface.

The substrate layer 26 may be an elongated piece of substrate layer material, such that the substrate layer 26 may be applied as a continuous strip or sequential strips joined or abutting at the respective strip ends to form the continuous barrier track 12, 14. The substrate layer 26 may alternatively comprise a plurality of barrier track sections 30, 31. As shown in FIGS. 6A-6D, the substrate layer 26 may comprise a plurality of barrier track sections 30, 31 mechanically interlocked with one another to form a linkage 50 that defines the substrate layer 26 of the continuous barrier track 12, 14.

Each barrier track section 30, 31 may be generally polygonal, for example, a quadrilateral barrier track section 30, 31 having the barrier track width 40*a*, 40*b* and the barrier track thickness 42*a*. 42*b*. Alternatively, in another example, as shown in FIGS. 6A-6D, the barrier track sections 30, 31 may be formed in a pin connection, a turnbuckle connection, a tongue-and-groove connection, a dovetail connection, a jigsaw or puzzle connection, or the like, wherein each barrier section 30, 31 defines a body 44, at least one extension member 46, and at least one void 48 extending into the body 44. The at least one extension member 46 may extend outwardly from the body 44, such that the at least one extension member 46 of a first barrier track section 30*a*, 31*a* is configured to be received by the at least one void 48 defined by a second barrier track section 30*b*, 3*b*, to thereby interlock the first barrier track section 30*a*, 31*a* and the second barrier track section 30*b*, 31*b*.

Figure 6A:
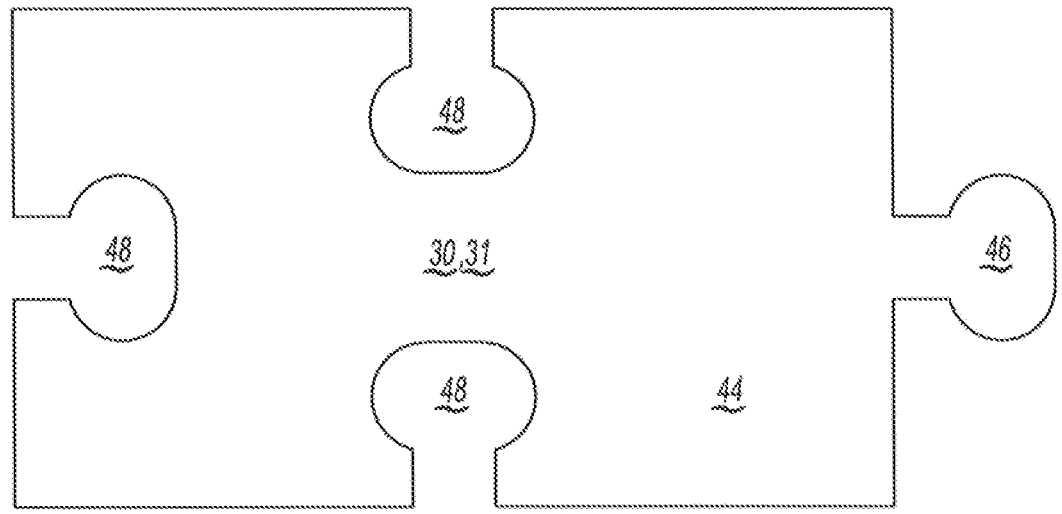
FIG. 6A is a plan view of a first example barrier track section.
Figure 6B:
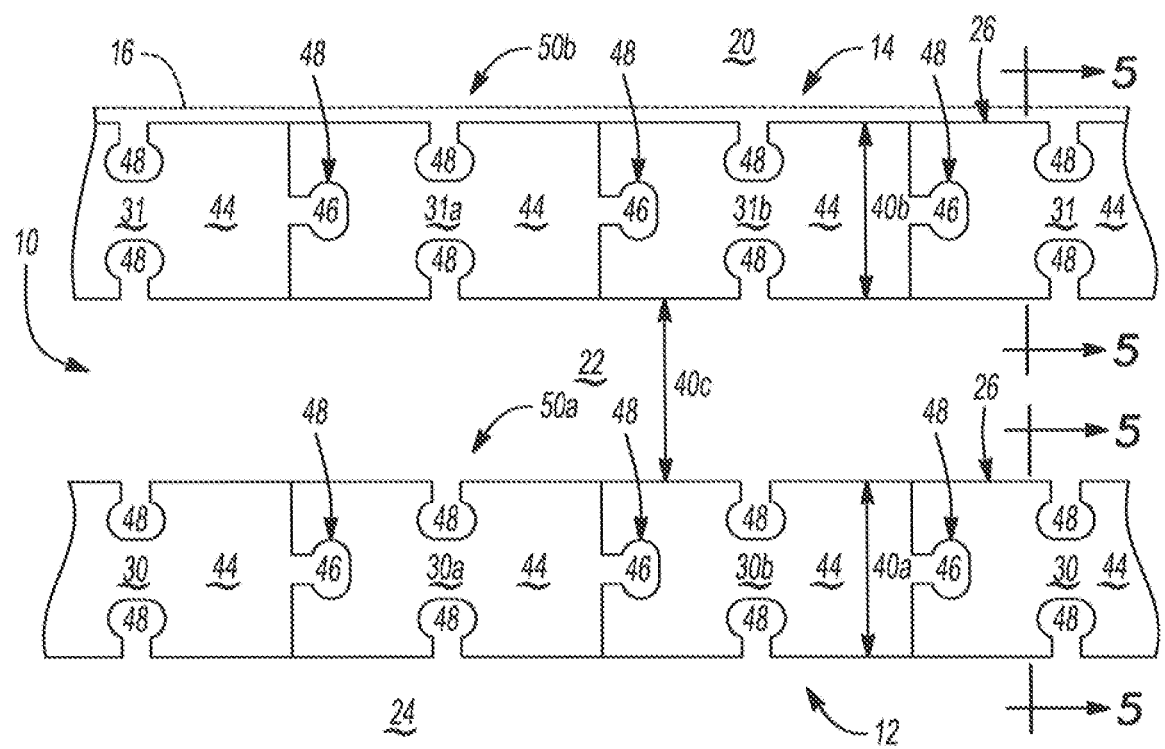
FIG. 6B is a plan view of a plurality of first example barrier track sections interlocked with one another to form a substrate layer of the respective barrier track.
Figure 6C:
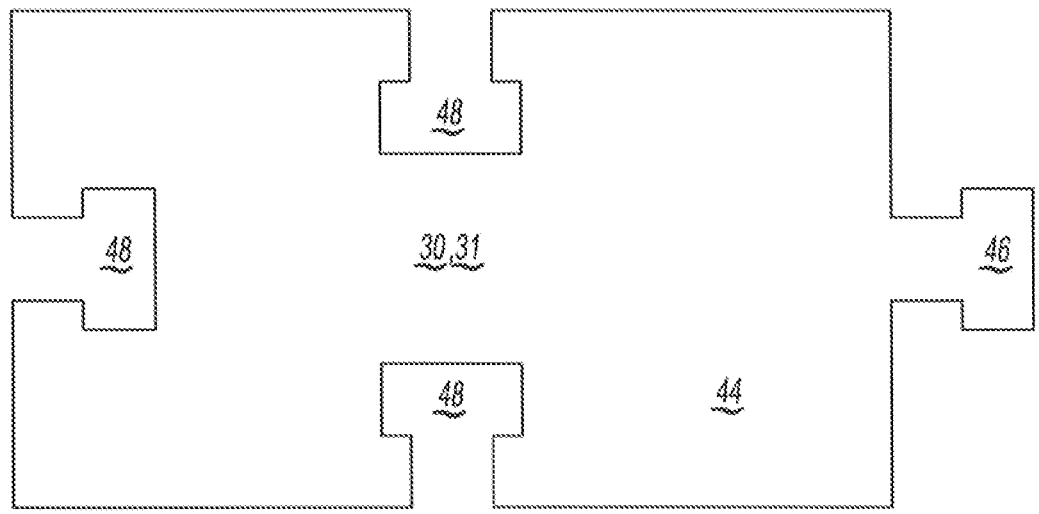
FIG. 6C is a plan view of a second example barrier track section.
Figure 6D:
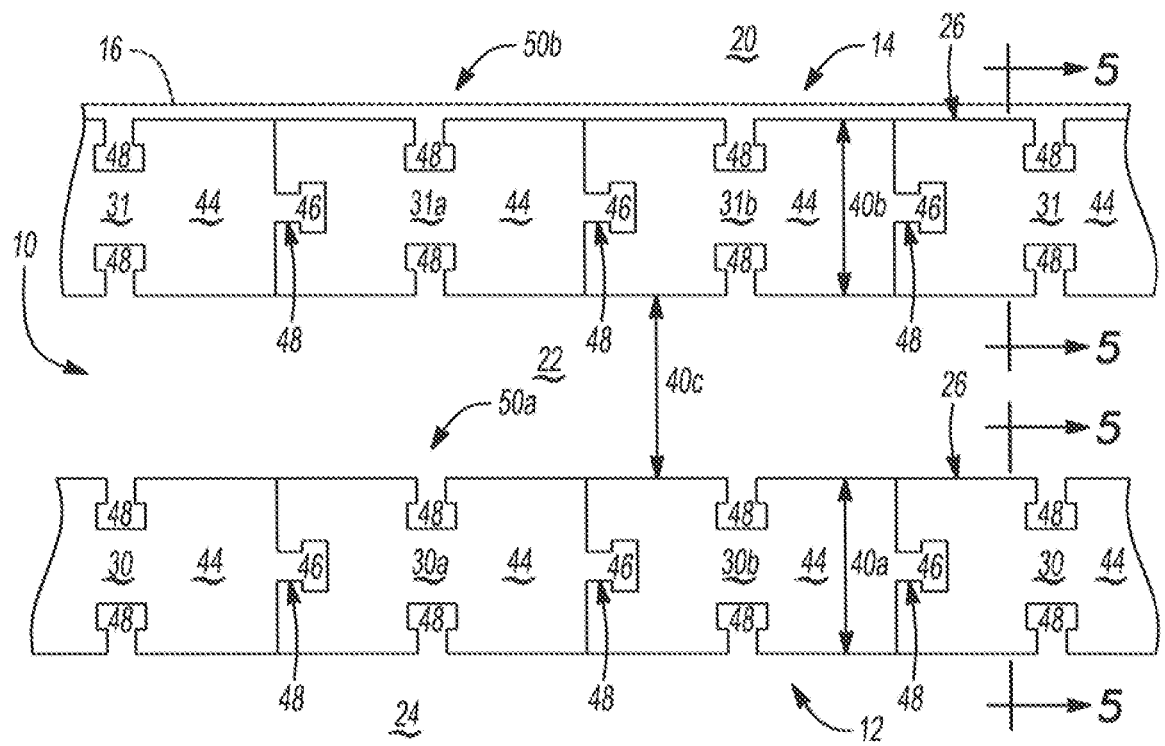
FIG. 6D is a plan view of a plurality of the second example barrier track sections interlocked with one another to form a substrate layer of the respective barrier track.

The interlock between the respective barrier track sections 30*a*, 31*a*, 30*b*, 31*b* forms a barrier track linkage 50, as shown in FIGS. 6B and 6D that defines the substrate layer 26 of the continuous barrier track 12, 14. Interlocking barrier track sections 30*a*, 31*a*, 30*b*, 31*b* allow the continuous barrier track 12, 14, to take on nearly any shape or any perimeter 16 size or length, as the barrier track sections 30*a*, 31*a*, 30*b*, 31*b* are advantageous in that the same allow the continuous barrier track to be customizable in shape and size. Interlocking barrier track sections 30*a*, 31*a*, 30*b*, 31*b* allow the continuous barrier track 12, 14 to be disposed in for example, a linear arrangement, a curved arrangement, a curvilinear arrangement, or another joint configuration including but not limited to abutting, contoured, or overlapping ends.

In the multi-layer barrier track example, illustrated in FIGS. 5A-5B, the substrate layer 26 may be coated with a topical catch layer 28, such that the topical catch layer 28 is disposed on the first surface 34 of the substrate layer 26. The topical catch layer 28 may comprise a first adhesive material, wherein the first adhesive material comprises a quantity of a pressure-sensitive adhesive material disposed throughout the topical catch layer 28, such that the quantity of pressure sensitive adhesive dispersed throughout the topical catch layer 28 is sufficient to restrain a pest 100 from free movement away from the topical catch layer 28. In this way, the pest control barrier 10 prevents the respective pest 100, including but not limited to rodents, snakes, insects, arachnids, and/or other pests, from entering or exiting the interior space 20 and/or an object 18 contained in the outer boundary of the interior space 20 within the established predefined perimeter 16. In one example, the barrier track 12, 14 may be placed about a perimeter 16 of an object 18 that the user desired to keep pest 100 free. In another example, the barrier track 12, 14 may be placed about a perimeter 16 of an object 18 known to contain pests 100, that the user wishes to contain within the interior space 20 defined by the perimeter 16.

More particularly, the topical catch layer 28, may be an adhesive tape that is rolled out to the length of the barrier track linkage 50a, 50b or substrate layer 26 and secured to the first surface 34 thereof. Alternatively, the topical catch layer 28 may be an adhesive binder or coating applied directly the first surface of the substrate layer 26. In such instances, the first adhesive material may be an elastomeric material, for example, a natural rubber adhesive or a synthetic rubber resin adhesive with an adhesion strength of from about 1.5 pounds per inch to about 10.0 pounds per inch. As detailed herein above, wherein the topical catch layer 28 is an adhesive tape, suitable example adhesive tapes may have a thickness from about 0.0005 inches to about 0.01 inches and a peel adhesion strength, pursuant to ASTM D3330, of from about 2.0 pounds per inch to about 6.5 pounds per inch. Suitable, commercially-available example tapes include, but are not limited to product sold under the following product identifiers: "Scotch® General Purpose Cloth Duct Tape 393", "3M® Heavy Duty Duct Tape 3939", "3M® Repositionable Tape 9425", and "FT EZ-8" by Avery Dennison Corporation.

The first adhesive material may be selected from a group of adhesive materials to provide an adhesion strength corresponding to the size and weight of the anticipated pest 100 to be entrapped on the barrier track 12, 14. Said another way, the adhesion strength of the first adhesive material will increase as the size and weight of the anticipated pest increases. For example, as in the single layer barrier track 12, 14 example, when the intended pest 100 is a larger pest such as a rodent or the like, a greater adhesion strength may be needed to secure the respective pest on the barrier track 12, 14 than when the intended pest is a smaller pest, such as a small insect.

Further, in some multi-layer barrier track 12, 14 embodiments, as shown in FIGS. 4 and 5B, the barrier track 12, 14 may further comprise a mounting layer 29 disposed on the second surface 36 of the substrate layer 26. The mounting layer 29 may comprise a second adhesive material. The second adhesive material may be a resin binder, an adhesive tape, or the like sufficient to couple the second surface 36 of the substrate layer 26 to the desired mounting surface, such as a floor, wall, ceiling, or another surface. As detailed herein, the mounting surface may be a planar mounting surface, such as a polished concrete, wood, or laminate floor, a vertical wall, a ceiling, or another planar surface.

The second adhesive material may be selected from a group of adhesive materials to provide an adhesive peel strength corresponding to the size and weight of the anticipated pest 100 to be entrapped on the topical catch layer 28 of the barrier track 12, 14. For example, as in the single layer barrier track 12, 14 example, when the intended pest 100 is a larger pest such as a rodent or the like, a greater peel strength may be needed to secure the barrier track 12, 14 to the mounting surface than when the intended pest 100 is a smaller pest, such as a small insect. Said another way, the adhesion peel strength of the second adhesive material will increase as the size and weight of the anticipated pest 100 increases, so as to prevent the respective pest 100 from adhering itself to the topical catch layer 28 and then walking off the barrier track 12, 14 attached to its body as may result if the adhesive peel strength of the second adhesive material is not equal to or greater than a predetermined threshold adhesive peel strength determined relative to the size and weight of the anticipated pest 100.

The barrier track 12, 14 whether of a single layer construction or a multi-layer construction, is formed as a continuous loop that extends around an entirety of the predefined perimeter 16 without interruption.

Additionally, in some examples the barrier track 12, 14 may comprise only a first barrier track 14, or in other examples may comprise multiple barrier tracks, for example, a first barrier track 14 and a second barrier track 12, or in still other examples, may comprise multiple barrier tracks, for example, a first barrier track 14 and a second barrier track 12, a third barrier track (not shown), etc.

As shown in FIGS. 1A, 2-3, 7A-7B, and 8A-8C, in examples wherein the barrier track 12, 14 comprises each of a first barrier track 14 and a second barrier track 12, the first barrier track 14 is disposed between the interior space 20 and the object 18 therein, and the second barrier track 12. The second barrier track 12 may be spaced apart from and disposed in a concentric configuration about the first barrier track 14, such that the second barrier track 12 is radially spaced apart from the first barrier track 14. In this way, a landing zone 22 may be disposed between the first barrier track 14 and the second barrier track 12.

As best illustrated in FIGS. 7A-8C, the pest control system 10 having a first barrier track 14 and a second barrier track 12 may be operable to function as a pest capture apparatus, such that the prospective pest travels, e.g., walks, crawls, slithers, hops, and/or jumps, onto the pressure-sensitive adhesive material disposed on the continuous barrier tracks 12, 14 and remains stuck thereon. In this way, the pest control barrier 10 prevents the respective pest 100, including but not limited to rodents, snakes, insects, arachnids, pedes, scorpions, and/or other pests, from entering or exiting the interior space 20 and/or an object 18 contained in the outer boundary of the interior space 20 within the established predefined perimeter 16. Said another way, the continuous barrier tracks 12, 14 prohibit a pest 100 from moving between the interior space 20 and the exterior space 24.

Figure 7A:
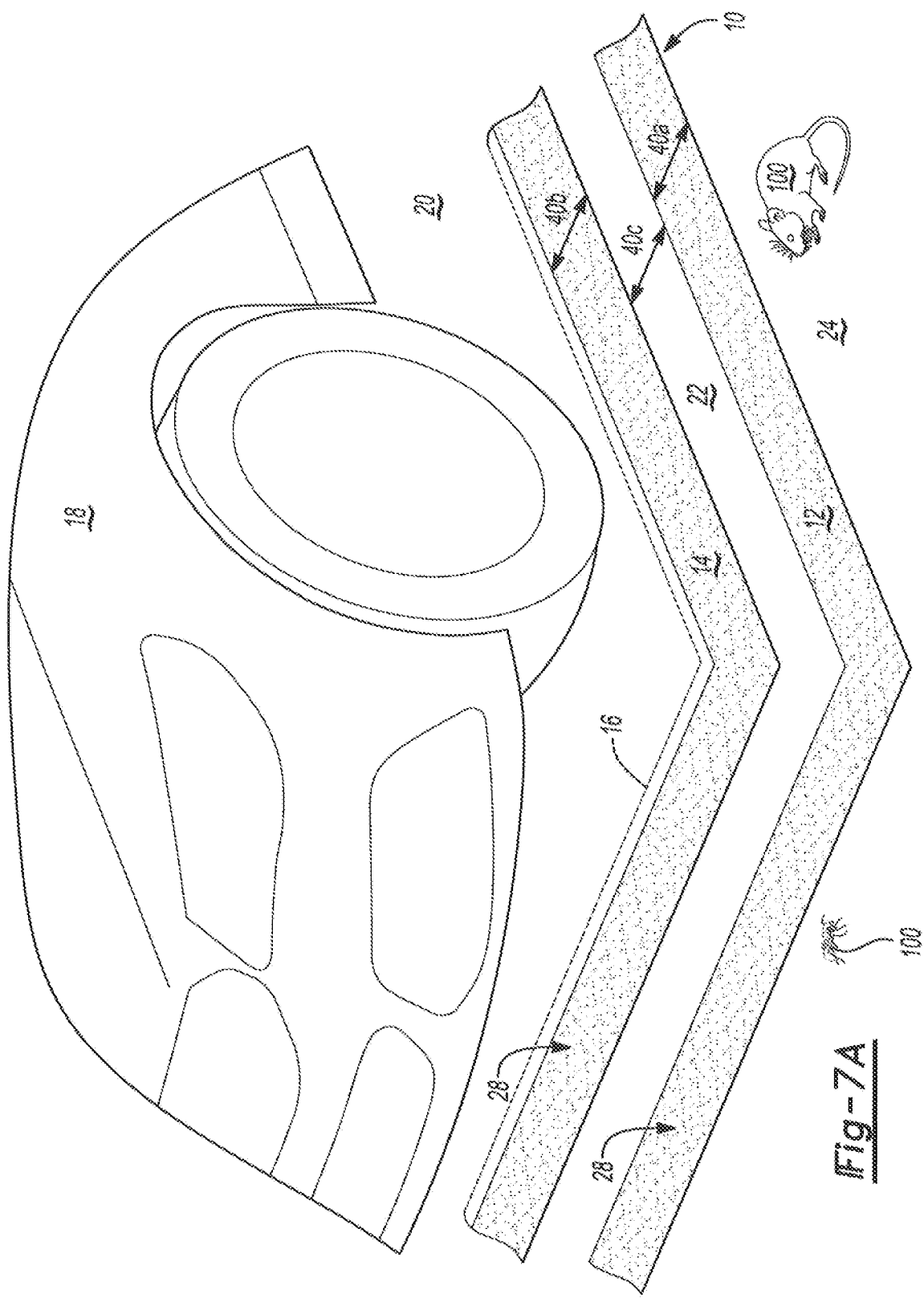
FIG. 7A is a schematic perspective view of the example pest control barrier with a pest approaching the first barrier track.

In one example, shown in FIGS. 7A-7B, at FIG. 7A the pest 100 approaches the second barrier track 12, and at FIG. 7B the pest 100 travels on to, e.g., walk, crawl, etc., onto the topical catch layer 28 of the second barrier track 12 thereby applying pressure to the pressure sensitive adhesive contained in the first adhesive material with its body weight. The first adhesive material then adheres to the whisker, foot, appendage, underbelly, or another portion of the respective pest 100 thereby trapping the pest 100 upon the topical catch layer 28 of the second barrier track 12. In this way, the pest 100 is prevented from passing the predefined perimeter 16 and/or entering or exiting the interior space 20 or the object 18 within the interior space 20.

Figure 8A:
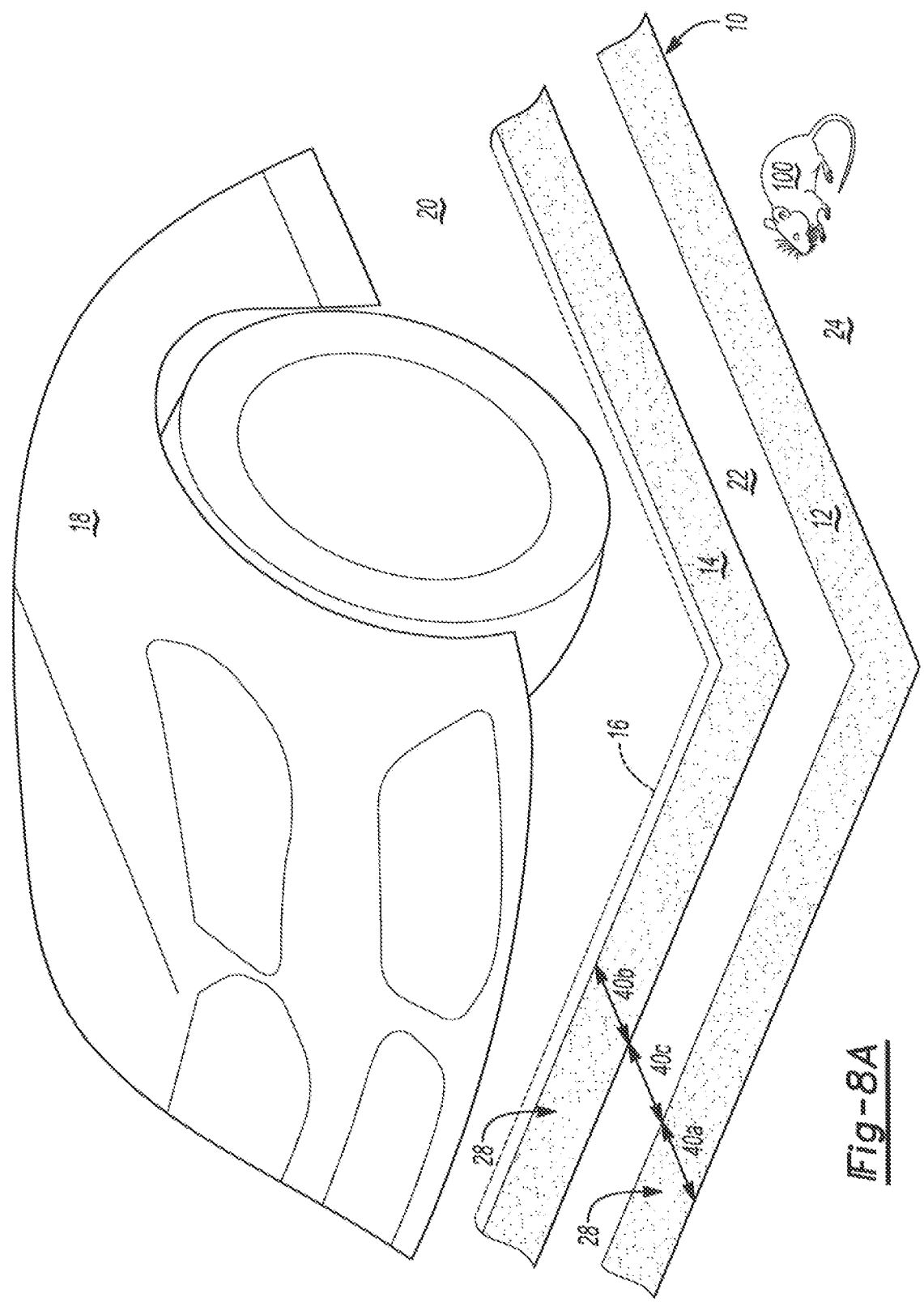
FIG. 8A is a schematic perspective view of the example pest control barrier with a pest approaching the first barrier track.
Figure 8B:
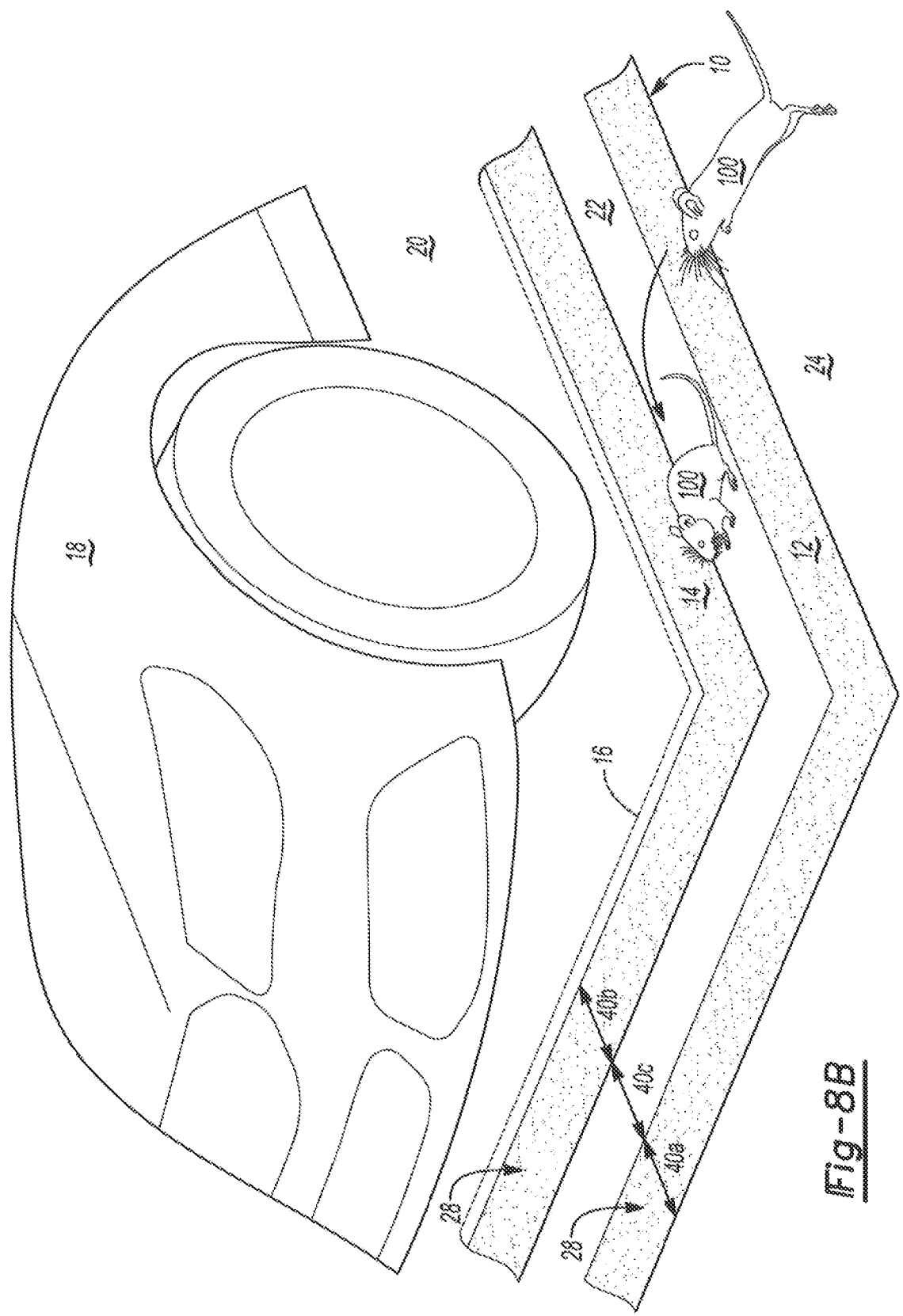
FIG. 8B is a schematic perspective view of the example pest control barrier with a pest traversing the first barrier track via jumping or flying and landing in a landing zone between the first barrier track and the second barrier track.
Figure 8C:
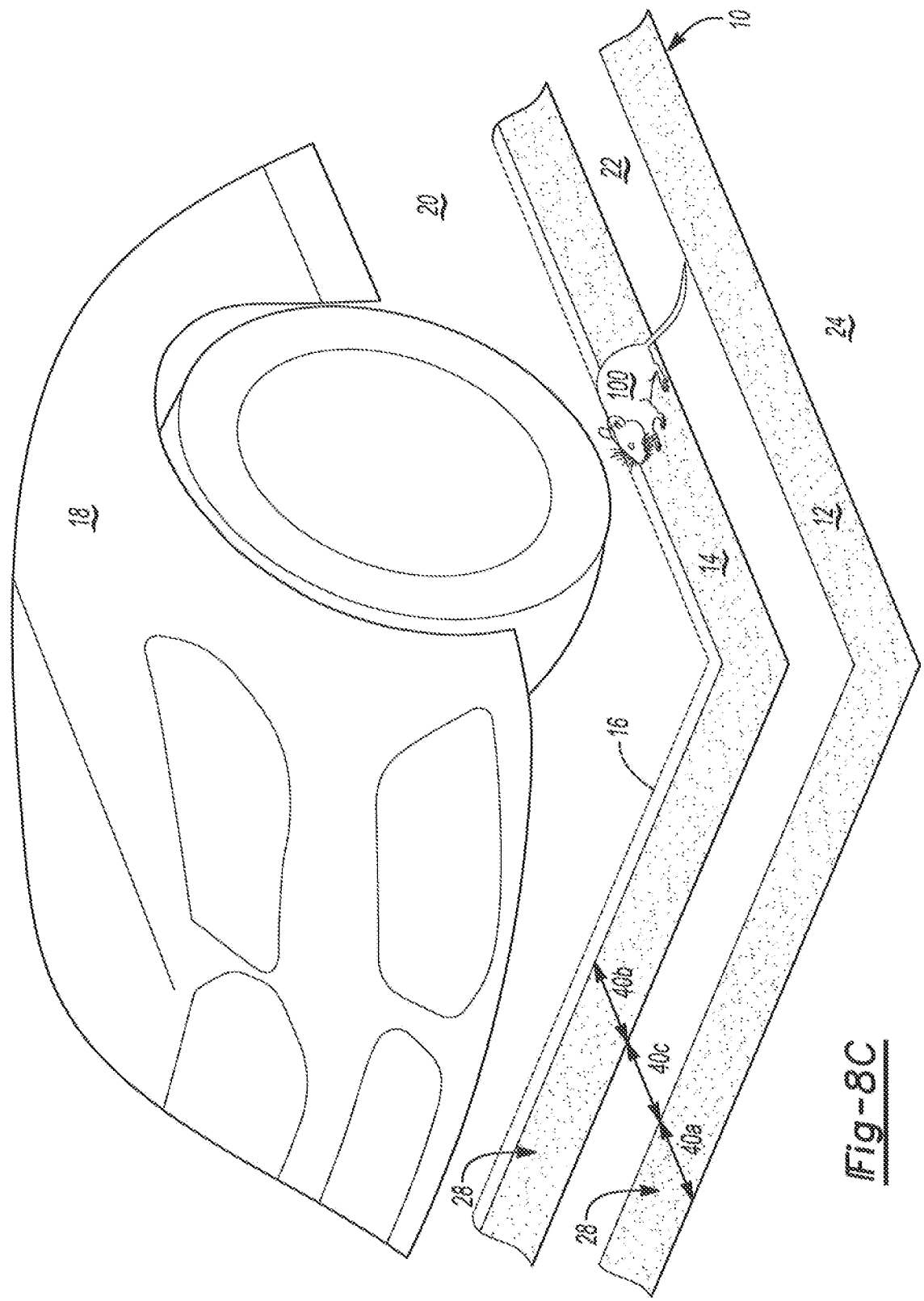
FIG. 8C is a schematic perspective view of the example pest control barrier with a pest restrained on and/or inhibited from free movement away from the second barrier track.

In another example, shown in FIGS. 8A-8C, at FIG. 8A the pest 100 approaches the second barrier track 12. In the event that the pest 100 does sense the second barrier track 12, either in a visual sense or a tactile sense, at FIG. 8B the pest 100 may attempt to jump or otherwise clear the initial barrier, i.e., the second barrier track 12. In this way, the pest 100 may jump or clear the second barrier track 12 and position itself in the landing zone 22. In such an instance, the first barrier track 14 remains a barrier to the traversal of the pest 100 across the predefined perimeter 16, and thereby bars entry into or exit from the interior space 20, the object 18 within the interior space 20. In this way, at FIG. 8C, the pest 100 may travel on to, e.g., walk, crawl, etc., onto the topical catch layer 28 of the first barrier track 14 thereby applying pressure to the pressure sensitive adhesive contained in the first adhesive material with its body weight. The first adhesive material then adheres to the whisker, foot, appendage, underbelly, or another portion of the respective pest 100 thereby trapping the pest 100 upon the topical catch layer 28 of the first barrier track 14. In this way, the pest 100 is prevented from passing across the predefined perimeter 16 and/or entering the interior space 20 or the object 18 within the interior space 20.

Alternatively, the pest 100 may approach the second barrier track 12. In the event that the pest 100 does sense the second barrier track 12, either in a visual sense or a tactile sense, at FIG. 8B the pest 100 may attempt to jump or otherwise clear the initial barrier, i.e., the second barrier track 12. In this way, the pest may jump or clear the second barrier track 12 and position itself on the topical catch layer 28 of the first barrier track 14.

In order for the pest control system 10 to workably operate as a pest capture apparatus, the first barrier track 14, the second barrier track 12, and the landing zone 22 may be sized relative to the anticipated pest 100, e.g., the largest anticipated pest 100 for the given usable area around the predefined perimeter 16, interior space 20 and/or the object 18 therein.

As such, the first barrier track 14 may have a width 40b and a thickness 42b, and the second barrier track 12 may have a width 40a and a thickness 42a. The thickness 42a, 42b may range from about 0.010 inches to about 0.313 inches. Such a thickness 42a, 42b range allows for the barrier tracks 12, 14 to remain robust enough to serve the desired pest deterring and capturing function, while blending into the surroundings in the usable area around the predefined perimeter 16, interior space 20 and/or the object 18 therein.

The first barrier track 14 may have a first barrier track width 40b of from about 1.0 inches to about 8.0 inches. The second barrier track 12 may have a second barrier track width 40a of from about 1.0 inches to about 8.0 inches. The landing zone 22 may have a landing zone width 40c of from about 0.25 inches to about 8.0 inches. In some example embodiments, the first barrier track width 40b, the second barrier track width 40a, and the landing zone width 40c may be substantially equivalent. In other embodiments, the first barrier track width 40b, the second barrier track width 40a, and the landing zone width 40c may each be different. As detailed herein above, the first barrier track width 40b, the second barrier track width 40a, and the landing zone width 40c may vary within the range based on the anticipated pest 100.

In examples wherein the anticipated pest is an insect, with a small or nonexistent jump range or jump ability and a relatively low body weight, the first barrier track width 40b, the second barrier track width 40a, and the landing zone width 40c may be less than in examples wherein the anticipated pest 100 is a rodent, with a higher jump range and relatively greater body weight. In one example, wherein the anticipated pest 100 is an insect, the first barrier track width 40b, the second barrier track width 40a, and the landing zone width 40c may each be from about 0.25 inches to about 3.0 inches. In another example wherein the anticipated pest 100 is a rodent, the first barrier track width 40b, the second barrier track width 40a, and the landing zone width 40c may each be from about 3.0 inches to about 8.0 inches.

As detailed herein above, each of the first barrier track 14 and the second barrier track 12 may be formed in a single layer or multi-layer construction. In one example, the first barrier track 14 and the second barrier track 12 may be formed in a single layer construction. In another example, the first barrier track 14 may be formed in the single layer construction and the second barrier track 12 may be formed in the multi-layer construction. In still another example, the first barrier track 14 may be formed in the multi-layer construction and the second barrier track 12 may be formed in the single-layer construction. In still another example, the first barrier track 14 and the second barrier track 12 may be formed in a multi-layer construction.

The continuous barrier track 12, 14 whether of a single layer construction or a multi-layer construction, may be a continuous and closed loop that extends around an entirety of the predefined perimeter 16 without interruption.

In a non-limiting example wherein at least one of the first barrier track 14 and the second barrier track 12 are formed in a single-layer construction, the respective single layer barrier track may be a two-sided adhesive tape or another adhesive member having an adhesion strength of from about 1.5 pounds per inch to about 10.0 pounds per inch, and more particularly, from about 2.0 pounds per inch to about 6.5 pounds per inch. The adhesion strength of the adhesive tape will increase with the size of the anticipated pest. For example, when the intended pest is a larger pest such as a rodent or the like, a greater adhesion strength may be needed to secure the respective pest on the respective barrier track 12, 14 than when the intended pest is a smaller pest, such as a small insect. In this way, the pest control barrier 10 prevents the respective pest 100, including but not limited to rodents, snakes, insects, arachnids, pedes, scorpions, and/or other pests, from entering or exiting the interior space 20 and/or an object 18 contained in the outer boundary of the interior space 20 within the established predefined perimeter 16. In one example, the barrier track 12, 14 may be placed about a perimeter 16 of an object 18 that the user desired to keep pest 100 free. In another example, the barrier track 12, 14 may be placed about a perimeter 16 of an object 18 known to contain or house pests 100, that the user wishes to contain within the interior space 20 defined by the perimeter 16.

The adhesive tape may be a cloth tape, vinyl tape, or other tape construction. As detailed herein above, wherein the topical catch layer 28 is an adhesive tape.

In another example, wherein at least one of the first barrier track 14 and the second barrier track 12 are formed in a multi-layer construction, the respective multi-layer barrier track 12, 14 may comprise a substrate layer 26 having a first surface 34 and a second surface 36. The substrate layer 26 may be comprised of a flexible material, such as a polymeric material, an elastomeric material, a vinyl material, or the like, such that the respective barrier track 12, 14 may be installed on a planar mounting surface, such as a polished concrete, wood, or laminate floor, a vertical wall, a ceiling, or another planar surface, or alternatively non-planar, uneven, or irregular surface, such as a dirt, stucco, textured concrete, or tiled floor or another non-planar, uneven, or irregular surface.

The substrate layer 26 may be an elongated piece of substrate layer material. The substrate layer 26 may alternatively comprise a plurality of barrier track sections 30, 31. In this way the first barrier track 14 may comprise a first plurality of barrier sections 31 and the second barrier track 12 may comprises a second plurality of barrier sections 30. As shown in FIGS. 6A-6D, the substrate layer 26 may comprise a plurality of barrier track sections 30, 31 interlocked with one another to form a track linkage 50a, 50b that defines the substrate layer 26 of the continuous barrier track 12, 14.

Each of the first plurality of barrier track sections 31 may be generally polygonal, particularly quadrilateral barrier track sections 31 having the barrier track width 40*b* and the barrier track thickness 42*b*. Alternatively, in another example, as shown in FIGS. 6A-6D, the first plurality of barrier track sections 31 may be formed in a pin connection, a turnbuckle connection, a tongue-and-groove connection, a dovetail connection, a jigsaw or puzzle connection, or the like, wherein each barrier track section 31 defines a body 44, at least one extension member 46 extending outwardly from the body 44, and at least one void 48 extending into the body 44. The at least one extension member 46 may extend outwardly from the body 44, such that the at least one extension member 46 of a first barrier track section 31*a* is configured to be received by the at least one void 48 defined by a second barrier track section 31*b*, to thereby mechanically interlock the first barrier track section 31*a* and the second barrier track section 31*b*. The interlock between the respective barrier track sections 31*a*, 31*b* forms a barrier track linkage 50*b*, as shown in FIGS. 6B and 6D that defines the substrate layer 26 of the continuous first barrier track 14.

Each of the second plurality of barrier track sections 30 may be generally polygonal, particularly quadrilateral barrier track sections 30 having the barrier track width 40*a* and the barrier track thickness 42*a*. Alternatively, in another example, as shown in FIGS. 6A-6D, the second plurality of barrier track sections 30 may be formed in a formed in a pin connection, a turnbuckle connection, a tongue-and-groove connection, a dovetail connection, a jigsaw or puzzle connection, or the like, wherein each barrier track section 30 defines an body 44, at least one extension member 46 extending outwardly from the body 44, and at least one void 48 extending into the body 44. The at least one extension member 46 may extend outwardly from the body 44, such that the at least one extension member 46 of a first barrier track section 30*a* is configured to be received by the at least one void 48 defined by a second barrier track section 30*b*, to thereby interlock the first barrier track section 30*a* and the second barrier track section 30*b*. The mechanical interlock between the respective barrier track sections 30*a*, 30*b* forms a barrier track linkage 50*a*, as shown in FIGS. 6B and 6D that defines the substrate layer 26 of the continuous second barrier track 12.

As illustrated in FIGS. 1A-3 and 5A-8C each of the first barrier track 14 and the second barrier track 12 may be coated with a topical catch layer 28, such that the topical catch layer 28 is disposed on the first surface 34 of the substrate layer 26. The topical catch layer 28 may comprise a first adhesive material, wherein the first adhesive material comprises a quantity of a pressure-sensitive adhesive material disposed throughout the topical catch layer 28, such that the quantity of pressure sensitive adhesive dispersed throughout the topical catch layer 28 is sufficient to restrain a pest 100 from free movement away from the topical catch layer 28. Contrarily, the landing zone 22 does not contain any quantity of the pressure sensitive adhesive.

More particularly, the topical catch layer 28, may be an adhesive tape that is rolled out to the length of the barrier track linkage 50*a*, 50*b* or substrate layer 26 and secured to the first surface 34 thereof. Alternatively, the topical catch layer 28 may be an adhesive binder or coating applied directly the first surface of the substrate layer 26. In such instances, the first adhesive material may be an elastomeric material, such as a natural rubber adhesive or a synthetic rubber resin adhesive with an adhesive peel strength, pursuant to ASTM D3330, of from about 1.5 pounds per inch to about 10.0 pounds per inch. In one example, the first adhesive material may be an adhesive tape such as a cloth tape, vinyl tape, or other tape construction, with an adhesive peel strength, pursuant to ASTM D3330, of from about 2.0 pounds per inch to about 6.5 pounds per inch.

Further, in some multi-layer barrier track 12, 14 embodiments, as shown in FIG. 5B, the first barrier track 14 and the second barrier track 12 may further comprise a mounting layer 29 disposed on the second surface 36 of the substrate layer 26. The mounting layer 29 may comprise a second adhesive material. The second adhesive material may be a resin binder, an adhesive tape, or the like sufficient to couple the second surface 36 of the substrate layer 26 to the desired mounting surface, such as a floor, wall, ceiling, or another surface.

As such, the pest control apparatus 10 is adapted for use as a pest capture apparatus, such that the prospective pest travels, e.g., walks, crawls, slithers, hops, and/or jumps, onto the pressure-sensitive adhesive material disposed on at least one of the first barrier track 14 or the second barrier track 12 and remains stuck thereon. In this way, the pest control barrier 10 acts as a complete blockade of prospective pests, including but not limited to rodents, snakes, insects, arachnids, pedes, scorpions, and/or other pests, across the predefined perimeter 16 into or out of the interior space 20 and/or an object 18 contained in the outer boundary of the interior space 20 within the established predefined perimeter 16.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A pest control barrier comprising:
a predefined perimeter disposed on a surface, the predefined perimeter defining a boundary between an interior space defined by the surface and an exterior space defined by the surface, such that the predefined perimeter is disposed along an entirety of a periphery of the interior space, and wherein the surface is disposed in a first plane;
a continuous barrier track positioned about the periphery of the interior space and along an entirety of the predefined perimeter, wherein the continuous barrier track comprises:
a topical catch layer comprising a first adhesive material, the first adhesive material comprising a quantity of pressure sensitive adhesive disposed throughout the topical catch layer; and
a substrate layer comprising a plurality of barrier track sections aligned in a second plane and interlocked with each other to form a linkage, wherein each of the plurality of barrier track sections comprises at least a first barrier track section and a second barrier track section, each of the first barrier track section and the second barrier track section defining a body having a first side, a second side, a third side, and a fourth side, wherein at least one extension portion extends outwardly from the first side of the body, and a plurality of voids extending into the body, such that at least one void extends into the body at each of the second side, the third side, and the fourth side of the body of the respective barrier track section, wherein each void is disposed on only one of the second side, the third side, and the fourth side of the body of the respective barrier track section and each of the voids is configured to receive the at least one extension portion of another barrier track section of the plurality of barrier track sections;

wherein the continuous barrier track has a thickness of from about 0.010 inches to about 0.313 inches, and wherein the continuous barrier track has a width of from about 1.0 inches to about 8.0 inches;

wherein the first plane is parallel to the second plane, and wherein the second plane is spaced apart from the first plane by only the thickness of the continuous barrier track; and wherein the continuous barrier track is adapted for use as a pest capture apparatus, such that the quantity of pressure sensitive adhesive dispersed throughout the topical catch layer is sufficient to restrain a pest disposed thereon from free movement between the interior space and the exterior space.

2. The pest control barrier of claim 1 wherein the topical catch layer is an adhesive tape, and wherein the first adhesive material is at least one of natural rubber adhesive or a synthetic rubber resin adhesive material.

3. The pest control barrier of claim 2 wherein the first adhesive material has an adhesive peel strength of from about 1.5 pounds per inch to about 10.0 pounds per inch.

4. The pest control barrier of claim 3 wherein the substrate layer comprises a first surface and a second surface, and wherein the topical catch layer is disposed upon the first surface of the substrate layer.

5. The pest control barrier of claim 4 wherein the continuous barrier track further comprises a mounting layer disposed on the second surface of the substrate layer, and wherein the mounting layer comprises a second adhesive material.

6. The pest control barrier of claim 4 wherein the substrate layer is formed of a flexible material, such that the continuous barrier track is configured to be installed on a non-planar surface; and wherein the flexible material is at least one of a polymeric material, an elastomeric material, or a vinyl material.

7. The pest control barrier of claim 1 wherein the width is from about 1.0 inches to about 3.0 inches and wherein the pest is at least one of an insect, arachnid, or a pede.

8. The pest control barrier of claim 1 wherein the width is from about 3.0 inches to about 8.0 inches and wherein the pest is at least one of a rodent or a snake.

9. A pest control barrier comprising:

a predefined perimeter disposed on a surface, the predefined perimeter defining a boundary between an interior space defined by the surface and an exterior space defined by the surface, such that the predefined perimeter is disposed along an entirety of a periphery of the interior space, and wherein the surface is disposed in a first plane;

a first continuous barrier track having a continuous barrier track width of from about 3.0 inches to about 8.0 inches and a continuous barrier track thickness of from about 0.010 inches to 0.313 inches, positioned about the periphery of the interior space and along an entirety of the predefined perimeter, wherein the first continuous barrier track comprises:

a first topical catch layer comprising a first adhesive material, and wherein the first adhesive material comprises a quantity of pressure sensitive adhesive disposed throughout the topical catch layer; and a first substrate layer configured of flexible material having a first surface and a second surface, wherein the first topical catch layer is disposed on the first surface of the first substrate layer; and wherein the first substrate layer further comprises a first plurality of barrier track sections aligned in a second plane and interlocked with each other to form the first substrate layer, and wherein the first plurality of barrier track sections comprises at least a first barrier track section and a second barrier track section, and each of the respective barrier track sections of the first plurality of barrier track sections defines a body having a first side, a second side, a third side, and a fourth side, wherein at least one extension portion extends outwardly from the first side of the body, and a plurality of voids extends into the body such that at least one void extends into the body at each of the second side, the third side, and the fourth side of the body, wherein each void is disposed on only one of the second side, the third side, and the fourth side of the body of the respective barrier track section and each of the voids is configured to receive the at least one extension portion of another barrier track section of the first plurality of barrier track sections; and a second continuous barrier track having the continuous barrier track width of from about 3.0 inches to about 8.0 inches and the continuous barrier track thickness of from about 0.010 inches to about 0.313 inches, wherein the second continuous barrier track is spaced apart from and positioned concentrically about the first continuous barrier track, such that the first continuous barrier track is disposed between the second continuous barrier track and the predefined perimeter, the second continuous barrier track comprising:

a second topical catch layer comprising the first adhesive material;

a second substrate layer configured of flexible material having a first surface and a second surface, wherein the second topical catch layer is disposed on the first surface of the second substrate layer, and wherein the second substrate layer further comprises a second plurality of barrier track sections aligned in a third plane and interlocked with each other to form the second substrate layer, and wherein the second plurality of barrier track sections comprises at least a third barrier track section and a fourth barrier track section; and wherein each of the respective barrier track sections of the second plurality of barrier track sections defines a body having a first side, a second side, a third side, and a fourth side, wherein at least one extension portion extends outwardly from the first side of the body, and a plurality of voids extends into the body such that at least one void extends into the body at each of the second side, the third side, and the fourth side of the body of the respective barrier track section, wherein each void is disposed on only one of the second side, the third side, and the fourth side of the body of the respective barrier track section and each of the voids is configured to receive the at least one extension portion of another barrier track section of the plurality of second barrier track sections; and a landing zone disposed between the first continuous barrier track and the second continuous barrier track, the landing zone having a landing zone width substantially equivalent to the barrier track width, such that the landing zone extends from the first continuous barrier track to the second continuous barrier track, and wherein the landing zone does not contain any quantity of pressure sensitive adhesive, wherein the first plane is parallel to each of the second and third planes, and wherein the second plane is spaced apart from the first plane by only the thickness of the first continuous barrier track and the third plane is spaced apart from the first plane by only the thickness of the second continuous barrier track; and wherein the first continuous barrier track and the second continuous barrier track are each adapted for use as a rodent capture apparatus, such that the quantity of pressure sensitive adhesive dispersed throughout the first topical catch layer and the second topical catch layer is sufficient to restrain a pest disposed thereon from free movement across the boundary between the interior space and the exterior space.

10. The pest control barrier of claim 9 wherein each of the first topical catch layer and the second topical catch layer is an adhesive tape having an adhesive peel strength of from about 1.5 pounds per inch to about 10.0 pounds per inch; and wherein the first adhesive material is at least one of natural rubber adhesive or a synthetic rubber resin adhesive material.

11. The pest control barrier of claim 10 wherein:

the first continuous barrier track further comprises a first mounting layer disposed on the second surface of the first substrate layer, and wherein the first mounting layer comprises a second adhesive material; and the second continuous barrier track further comprises a second mounting layer disposed on the second surface of the second substrate layer, and wherein the second mounting layer comprises the second adhesive material.

12. The pest control barrier of claim 10 wherein:

the at least one extension portion at one side of the first barrier track section is configured to be received by one of the voids disposed at the opposing side of the second barrier track section, such that the first barrier track section interlocks with the second barrier track section; and the at least one extension portion at one end of the third barrier track section is configured to be received by one of the voids disposed at the opposing end of the fourth barrier track section, such that the third barrier track section interlocks with the fourth barrier track section.

13. The pest control barrier of claim 12 wherein the flexible material is at least one of a polymeric material, elastomeric material, and a vinyl material.

14. The pest control barrier of claim 5 wherein:

the at least one extension portion extending from the first side of the body of the first barrier track section is configured to be received by one of the voids extending into an opposing side of the second barrier track section, such that the first barrier track section interlocks with the second barrier track section.

15. The pest control barrier of claim 5 wherein:

the at least one extension portion extending from the first side of the body of the first barrier track section is configured to be received by at least one of the voids extending into one of the second, third, or fourth sides of the body of the second barrier track section, such that the first barrier track section interlocks with the second barrier track section.

16. The pest control barrier of claim 9 wherein:

the at least one extension portion extending from the first side of the body of the first barrier track section is configured to be received by one of the voids extending into the opposing side of the second barrier track section, such that the first barrier track section interlocks with the second barrier track section; and the at least one extension portion extending from the first side of the body of the third barrier track section is configured to be received by one of the voids extending into the opposing side of the fourth barrier track section, such that the third barrier track section interlocks with the fourth barrier track section.

17. The pest control barrier of claim 16 wherein:

the at least one extension portion extending from the first side of the body of the first barrier track section is configured to be received by one of the voids extending into one of the second, third, or fourth sides of the second barrier track section, such that the first barrier track section interlocks with the second barrier track section, and the at least one extension portion extending from the first side of the body of the third barrier track section is configured to be received by one of the voids extending into one of the second, third, or fourth sides of the fourth barrier track section, such that the third barrier track section interlocks with the fourth barrier track section.

18. A pest control barrier consisting of:

a predefined perimeter disposed on a surface, the predefined perimeter defining a boundary between an interior space and an exterior space, such that the predefined perimeter is disposed along an entirety of a periphery of the interior space and the surface is disposed in a first plane;

a continuous barrier track positioned about the periphery of the interior space and along an entirety of the predefined perimeter, wherein the continuous barrier track comprises:

a topical catch layer comprising a first adhesive material, the first adhesive material comprising a quantity of pressure sensitive adhesive disposed throughout the topical catch layer; and a substrate layer comprising a plurality of barrier track sections aligned in a second plane and interlocked with each other to form a linkage, wherein each of the plurality of barrier track sections comprises at least a first barrier track section and a second barrier track section, each of the first barrier track section and the second barrier track section defining a body having a first side, a second side, a third side, and a fourth four side, wherein at least one extension portion extends outwardly from the first side of the body, and at least one void extends into the body at each of the second side, the third side, and the fourth side of the body of the respective barrier track section, wherein each void is disposed on only one of the second side, the third side, and the fourth side of the body of the respective barrier track section and each of the voids is configured to receive the at least one extension portion of another barrier track section of the plurality of barrier track sections;

wherein the continuous barrier track has a thickness of from about 0.010 inches to about 0.313 inches, and wherein the continuous barrier track has a width of from about 1.0 inches to about 8.0 inches;

wherein the first plane is parallel to the second plane, and wherein the second plane is spaced apart from the first plane by only the thickness of the continuous barrier track; and wherein the continuous barrier track is adapted for use as a pest capture apparatus, such that the quantity of pressure sensitive adhesive dispersed throughout the topical catch layer is sufficient to restrain a pest disposed thereon from free movement between the interior space and the exterior space.

\* \* \* \* \*